(12) United States Patent
Zhong et al.

(10) Patent No.: US 10,996,817 B2
(45) Date of Patent: May 4, 2021

(54) OPERATION INTERFACE WITH SECTOR MENUS IN HIERARCHIES, AND PROCESSING METHOD AND DISPLAY DEVICE THEREOF

(71) Applicant: SZ DJI TECHNOLOGY CO., LTD., Shenzhen (CN)

(72) Inventors: Heli Zhong, Shenzhen (CN); Zhiyuan Zhang, Shenzhen (CN); Tao Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 358 days.

(21) Appl. No.: 15/468,382

(22) Filed: Mar. 24, 2017

(65) Prior Publication Data

US 2017/0192634 A1    Jul. 6, 2017

Related U.S. Application Data

(63) Continuation of application No. PCT/CN2014/088030, filed on Sep. 30, 2014.

(51) Int. Cl.
  *G06F 3/0482*  (2013.01)
  *G06F 3/0484*  (2013.01)
(52) U.S. Cl.
  CPC ........ *G06F 3/0482* (2013.01); *G06F 3/04845* (2013.01)
(58) Field of Classification Search
  CPC .................. G06F 3/0482; G06F 3/04845
  See application file for complete search history.

(56) References Cited

U.S. PATENT DOCUMENTS

| | | | | |
|---|---|---|---|---|
| 2004/0141010 A1* | 7/2004 | Fitzmaurice | ........ | G06F 3/04886 715/810 |
| 2005/0257273 A1* | 11/2005 | Naito | ........ | G06T 1/60 726/26 |
| 2012/0036434 A1* | 2/2012 | Oberstein | ........ | G06F 3/0482 715/702 |

(Continued)

FOREIGN PATENT DOCUMENTS

| CN | 101080068 A | 11/2007 |
|---|---|---|
| CN | 102331932 A | 1/2012 |

(Continued)

OTHER PUBLICATIONS

The World Intellectual Property Organization (WIPO), International Search Report for PCT/CN2014/088030, dated Jul. 2, 2015, 5 Pages.

*Primary Examiner* — Jennifer N To
*Assistant Examiner* — Reji Kartholy
(74) *Attorney, Agent, or Firm* — Anova Law Group, PLLC

(57) ABSTRACT

A method for processing an operation interface and a device for displaying an operation interface are provided. By displaying the operation interface with sector menus in hierarchies, a mapping relationship can be established between a previous level menu and a next level menu, such that a user may choose a corresponding option according to a desired operation in use, and the display layout may be in a way of sectors expanding outwardly. Thus, a more concise display may be achieved, a larger range of parameters may be configured, and more application scenarios can be satisfied.

15 Claims, 5 Drawing Sheets

(56) References Cited

U.S. PATENT DOCUMENTS

| | | | | |
|---|---|---|---|---|
| 2012/0124520 A1* | 5/2012 | Samp | ................ | G06F 3/04886 |
| | | | | 715/834 |
| 2012/0306788 A1 | 12/2012 | Chen | | |
| 2013/0019206 A1* | 1/2013 | Kotler | ................ | G06F 3/04886 |
| | | | | 715/834 |
| 2013/0104079 A1* | 4/2013 | Yasui | ................ | G06F 3/0482 |
| | | | | 715/834 |
| 2013/0127911 A1* | 5/2013 | Brown | ................ | G06F 3/04886 |
| | | | | 345/649 |
| 2014/0043517 A1* | 2/2014 | Yim | ................ | H04N 1/2112 |
| | | | | 348/333.02 |
| 2016/0026345 A1* | 1/2016 | Yao | ................ | G06F 3/04842 |
| | | | | 715/815 |

FOREIGN PATENT DOCUMENTS

| | | |
|---|---|---|
| CN | 103049176 A | 4/2013 |
| CN | 103699294 A | 4/2014 |

* cited by examiner

OPERATION INTERFACE WITH SECTOR MENUS IN HIERARCHIES, AND PROCESSING METHOD AND DISPLAY DEVICE THEREOF

CROSS-REFERENCE TO RELATED APPLICATION

This is a continuation application of International Application No. PCT/CN2014/088030, filed on Sep. 30, 2014, the entire contents of which are incorporated herein by reference.

TECHNICAL FIELD

The present invention relates to the field of terminal interface technologies and, in particular, to a method for processing an operation interface and a display device.

BACKGROUND OF THE INVENTION

With the development of smart mobile terminals, a mobile terminal may implement not only a simple function of taking photograph and video, but also provide more parameter choices. For example, the mobile terminal may set parameters such as a shooting mode, an image effect, a white balance and the like. However, due to limitations of general human-machine interaction configuration and display window, a user cannot set more parameters related to photographing and video shooting during operation and, thus, requirements for more application scenarios cannot be satisfied.

SUMMARY OF THE DISCLOSURE

In view of the above, the present disclosure provides a method for processing an operation interface and a display device thereof.

The method for processing an operation interface provided by the present disclosure may comprise:

configuring a first level menu, wherein the first level menu comprises a first option display area;

using the first option display area of the first level menu as a center of a circle, configuring at least two layers of concentric sector menu areas, wherein the configured sector menu areas include: a second level menu mapped with options of the first level menu and comprising a second option display area, and a third level menu mapped with options of the second level menu and comprising a third option display area;

when it is detected that an option of the first level menu is selected and triggered, displaying the second level menu according to a mapping relationship of the option of the first level menu; and when it is detected that an option of the second level menu is selected and triggered, displaying the third level menu according to a mapping relationship of the option of the second level menu.

In some embodiments, the first option display area of the first level menu may include a status display area and a first shortcut display area, and the method may further comprise:

when a selecting operation for an option of the first level menu is detected, displaying various options of the first level menu in the first shortcut display area; and displaying a selected and triggered option of the first level menu in the status display area.

In some embodiments, the first option display area of the first level menu may further include a second shortcut display area, and the method may further comprise:

after the selected and triggered option of the first level menu is displayed in the status display area, hiding the first shortcut display area and displaying the second shortcut display area; and displaying at least one shortcut option associated with the selected and triggered option of the first level menu in the second shortcut display area.

In some embodiments, the first option display area of the first level menu may further include a third shortcut display area and, before displaying the selected and triggered option of the first level menu in the status display area, the method may further comprise:

when it is detected that a scene mode option of the first level menu displayed in the first shortcut display area is selected and triggered, displaying the third shortcut display area; and displaying a scene option of the first level menu in the third shortcut display area.

In some embodiments, configuring at least two layers of concentric sector menu areas taking the first option display area of the first level menu as a center of a circle may specifically comprise:

configuring a first mapping relationship between an option of the first level menu and a plurality of options of the second level menu, wherein the second level menu includes the second option display area; and configuring a second mapping relationship between an option of the second level menu and a plurality of options of the third level menu, wherein the third level menu includes the third option display area.

In some embodiments, displaying various options of the first level menu in the shortcut display area may comprise:

evenly dividing the shortcut display area into a plurality of first option operation areas, a total number of which is equal to that of the options of the first level menu; and displaying one option of the first level menu in each first option operation area.

In some embodiments, after configuring a first mapping relationship between an option of the first level menu and a plurality of options of the second level menu, the method may further comprise:

evenly dividing the second option display area into a plurality of second option operation areas, a total number of which is equal to that of the options of the second level menu; and displaying one option of the second level menu in each second option operation area.

In some embodiments, after configuring a second mapping relationship between an option of the second level menu and a plurality of options of the third level menu, the method may further comprise:

evenly dividing the third option display area into a plurality of third option operation areas, a total number of which is equal to that of options of the third level menu; and displaying one option of the third level menu in each third option operation area.

In some embodiments, the method may further comprise:

when a view operation for an option of the second level menu is detected, displaying rotatably the second level menu using the first option display area as the center of the circle; and when a view operation for an option of the third level menu is detected, displaying rotatably the third level menu taking the first option display area as the center of the circle.

In some embodiments, when a function corresponding to a third option operation area is unavailable, the third option operation area becomes grey or hidden.

In some embodiments, the method may further comprise:
configuring a message prompting area; and
displaying in real time an option selected and triggered by a user in the message prompting area.

The present disclosure also provides a device for processing an operation interface, comprising:

a first configuration unit configured for configuring a first level menu, wherein the first level menu includes a first option display area;

a second configuration unit configured for configuring at least two layers of concentric sector menu areas using the first option display area of the first level menu as a center of a circle, wherein the at least two layers of concentric sector menu areas include a second level menu mapped with an option or options of the first level menu and comprising a second option display area, and a third level menu mapped with an option of the second level menu and comprising a third option display area;

a first display unit configured for, when it is detected that an option of the first level menu is selected and triggered, displaying the second level menu according to a mapping relationship of the option of the first level menu; and a second display unit configured for, when it is detected that an option of the second level menu is selected and triggered, displaying the third level menu according to a mapping relationship of the option of the second level menu.

In some embodiments, the first option display area of the first level menu may include a status display area and a first shortcut display area, and the device may further comprise:

a third display unit configured for, when a selecting operation for an option of the first level menu is detected, displaying various options of the first level menu in the first shortcut display area; and displaying a selected and triggered option of the first level menu in the status display area.

In some embodiments, the third display unit is further configured for, after displaying the selected and triggered option of the first level menu in the status display area, hiding the first shortcut display area and displaying the second shortcut display area, as well as displaying at least one shortcut option associated with the selected and triggered option of the first level menu in the second shortcut display area.

In some embodiments, the first option display area of the first level menu may further include a third shortcut display area, the third display unit may be further configured for, when it is detected that a scene mode option of the first level menu displayed in the first shortcut display area is selected and triggered, displaying the third shortcut display area, and displaying a shortcut function setting option corresponding to the selected scene mode option of the first level menu in the third shortcut display area.

In some embodiments, the second configuration unit may be further configured for configuring a first mapping relationship between an option of the first level menu and a plurality of options of the second level menu, wherein the second level menu may include the second option display area; and configuring a second mapping relationship between an option of the second level menu and a plurality of options of the third level menu, wherein the third level menu may include the third option display area.

In some embodiments, the second configuration unit may be further configured for evenly dividing a shortcut display area into a plurality of first option operation areas, a total number of which is equal to that of options of the first level menu, and displaying one option of the first level menu in each first option operation area.

In some embodiments, the second configuration unit may be further configured for evenly dividing the second option display area into a plurality of second option operation areas, a total number of which is equal to that of options of the second level menu, and displaying one option of the second level menu in each second option operation area.

In some embodiments, the second configuration unit may be further configured for evenly dividing the third option display area into a plurality of third option operation areas, a total number of which is equal to that of options of the third level menu, and displaying one option of the third level menu in each third option operation area.

In some embodiments, the second display unit is further configured for, when a view operation for an option of the second level menu is detected, displaying rotatably the second level menu taking the first option display area as the center of the circle;

the third display unit is further configured for, when a view operation for an option of the third level menu is detected, displaying rotatably the third level menu taking the first option display area as the center of the circle.

In some embodiments, the device may further comprise:
a third configuration unit configured for configuring a message display area;
a fourth configuration unit configured for displaying in real time an option selected and triggered by a user in a message prompting area.

The method for processing an operation interface may comprise: configuring a first level menu including a first option display area; configuring at least two layers of concentric sector menu areas using the first option display area of the first level menu as the center of a circle, the at least two layers of concentric sector menu areas including a second level menu mapped with various options of the first level menu and comprising a second option display area, and a third level menu mapped with various options of the second level menu and comprising a third option display; when it is detected that an option of the first level menu is triggered, displaying the second level menu according to a mapping relationship of the option; and, when it is detected that an option of the second level menu is triggered, displaying the third level menu according to a mapping relationship of the option. Thus, operation interfaces may be displayed in hierarchies in a sector through menus, a mapping relationship may be established between a previous level menu and a next level menu, such that a user may, during operation, choose a corresponding option according to a desired operation. Also, the sector-shaped layout for expanding outwardly may result in a more concise display, a larger range of parameters to be configured, and more application scenarios to be satisfied, improving the user experience.

DETAILED DESCRIPTION

The embodiments of the present invention provide a method for processing an operation interface and a device for displaying an operation interface, with which operation interfaces may be displayed in hierarchies in a sector manner through menus, so that the display may be more concise, a larger range of parameters may be allowed to be configured, and more application scenarios may be satisfied, improving the user experience.

For better understanding the solutions of the present disclosure by those skilled in the art, the technical solutions of the present disclosure will be described below in combination with the drawings in the embodiments of the present invention. It should be apparent that embodiments described herein are only a part rather than all of the embodiments of the present invention. All other embodiments obtained by those skilled in the art on the basis of the embodiments of the present invention without inventive efforts should fall within the protection scope of the present invention.

Terms "first", "second", "third", "fourth" and the like, in the specification and claims as well as above-described drawings of the present invention, are used for distinguishing similar objects, and not necessarily for describing a particular sequence or precedence order. It should be understood that, these numbers may be used interchangeably as appropriate, such that embodiments described herein may be implemented in a sequence other than that illustrated and described herein. Furthermore, terms "comprise" and "have", as well as any variations thereof, are intended to cover inclusion nonexclusively. For example, a process, method, system, product or apparatus including a series of steps or units is not necessarily limited to those exactly listed steps or units, and may include other steps or units that are not listed exactly or inherent for the process, method, product or apparatus.

Figure 1:
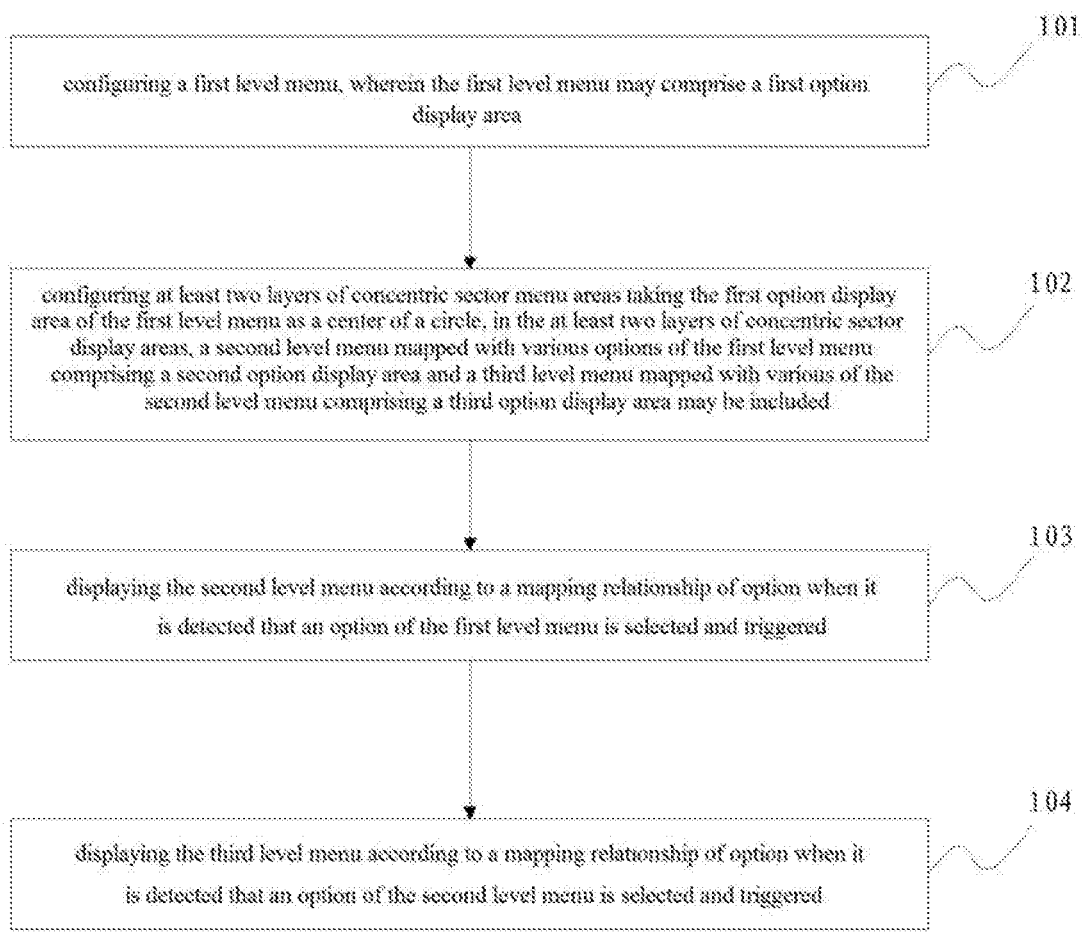
FIG. 1 is a flow chart of a method for processing an operation interface according to an embodiment of the present invention.
Figure 4:
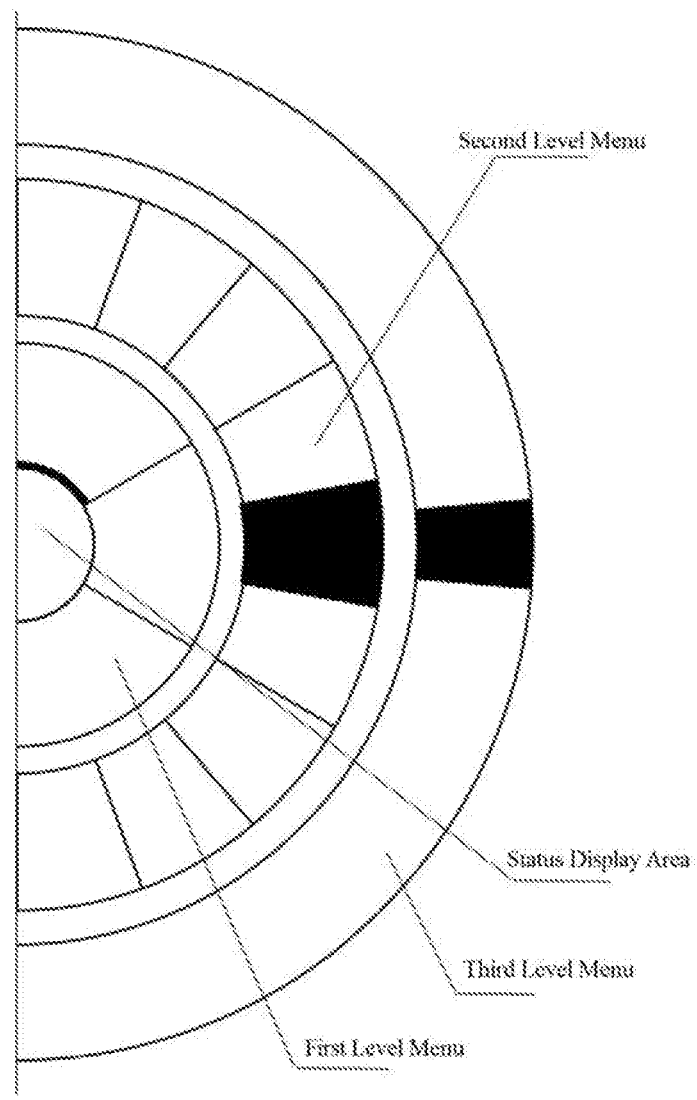
FIG. 4 is a schematic diagram of an interface of a device for processing an operation interface according to an embodiment of the present invention.

Referring to FIG. 1 and FIG. 4, a method for processing an operation interface according to an embodiment of the present invention is provided, the method may include the followings.

101, configuring a first level menu, and the first level menu may include a first option display area.

Operation interfaces in the present disclosure may comprise, but not limited to, display screens of communicating apparatuses such as a smart phone, a tablet, a Personal Digital Assistant (PDA) or the like, and a user may operate on the operation interfaces. In some embodiments, the first level menu may be a functional list and a region available for actual operation, and options for different functions may be set in the first option display area.

102, using the first option display area of the first level menu as the center of a circle, configuring at least two layers of concentric sector menu areas. The at least two layers of concentric sector menu areas includes: a second level menu mapped with the various options of the first level menu and comprising a second option display area, and a third level menu mapped with the various options of the second level menu and comprising a third option display area. The circle may be referred as a circle shaping menu display, that is, a circle provide shaping or contour of the display of the menus, and the sector(s) may be part of the circle.

That is, using the first option display area as the center of a circle, at least two layers of concentric sector menu areas may be configured, such that three levels of menus, when all displayed, may be distributed as a whole sector. The number of layers of sector regions may be set as required, the more a menu is divided, the more levels of the menu may be used. Four levels of menus, five levels of menus or even more levels of menus may be used. Actually, many layers of sector menu areas may be set when configured, as long as the levels of menus when all displayed may be distributed in a whole sector. Any number of layers of menus may be used.

Each level menu may include at least one option, an individual option of the first level menu may be in a mapping relationship with a plurality of options of the second level menu. For example, option A in the first level menu may be in a mapping relationship with option a1, option a2, and option a3 in the second level menu. In the same way, option B in the first level menu may be in a mapping relationship with option b1, option b2, and option b3 in the second level menu. After a user triggers a certain option in the first level menu, all options of the second level menu corresponding to the certain option may be popped up automatically, facilitating the user to choose one. Thus, an intuitional display may be achieved.

An individual option in the second level menu may be in a mapping relationship with a plurality of options in the third level menu. For example, option a1 in the second level menu may be in a mapping relationship with option a11, option a12, and option a13 in the third level menu. In the same way, option b1 in the second level menu may be in a mapping relationship with option b11, option b12, and option b13 in the third level menu. After a user triggers a certain option in the second level menu, all options of the third level menu corresponding to the certain option may be popped up automatically, facilitating the user to choose one. Thus, an intuitional display may be achieved.

103, when it is detected that an option of the first level menu is selected and triggered, displaying the second level menu according to a mapping relationship of the selected option.

Here, triggering may be referred as a certain option in the first level menu being operated by a user, and the triggering may be performed in a way of single click, double click, or shortcut key, without being limited herein. When it is detected that a certain option in the first level menu is operated by a user, a second level menu related to the certain option may be displayed according to a mapping relationship of the certain option. For example, option A in the first level menu may be in a mapping relationship with option a1, option a2, and option a3 in the second level menu and, when a user triggers option A in the first level menu, option a1, option a2, and option a3 in the second level menu may be displayed. Thus, an intuitional display effect may be achieved, and it is convenient for the user to choose an option in the second level menu.

104, when it is detected that an option of the second level menu is selected and triggered, displaying the third level menu according to a mapping relationship of the option.

Similarly, with the explanation about the triggering described above, when it is detected that a certain option in a second level menu is operated by a user, a third level menu related to the certain option may be displayed according to a mapping relationship of the certain option. For example, option a1 in the second level menu may be in a mapping relationship with option a11, option a12, and option a13 in the third level menu and, when a user triggers option a1 in the second level menu, option a11, option a12, and option a13 in the third level menu may be displayed. Thus, an intuitional display effect may be achieved, and it is convenient for a user to choose an option in the third level menu.

The method for processing an operation interface provided by the present disclosure may be widely applied in various situations, such as a remotely controlled unmanned aerial vehicle, remote monitoring or the like. The method for processing an operation interface may comprise: configuring a first level menu including a first option display area; configuring at least two layers of concentric sector menu areas using the first option display area of the first level menu as the center of a circle, the at least two layers of concentric sector menu areas including a second level menu mapped with various options of the first level menu and comprising a second option display area, and a third level menu mapped with various options of the second level menu and comprising a third option display; when it is detected that an option of the first level menu is triggered, displaying the second level menu according to a mapping relationship of the option; and, when it is detected that an option of the second level menu is triggered, displaying the third level menu according to a mapping relationship of the option. Thus, operation interfaces may be displayed in hierarchies in a sector through menus, a mapping relationship may be established between a previous level menu and a next level menu, such that a user may, during operation, choose a corresponding option according to a desired operation. Also, the sector-shaped layout for expanding outwardly may result in a more concise display, a larger range of parameters to be configured, and more application scenarios to be satisfied, improving the user experience.

Figure 2:
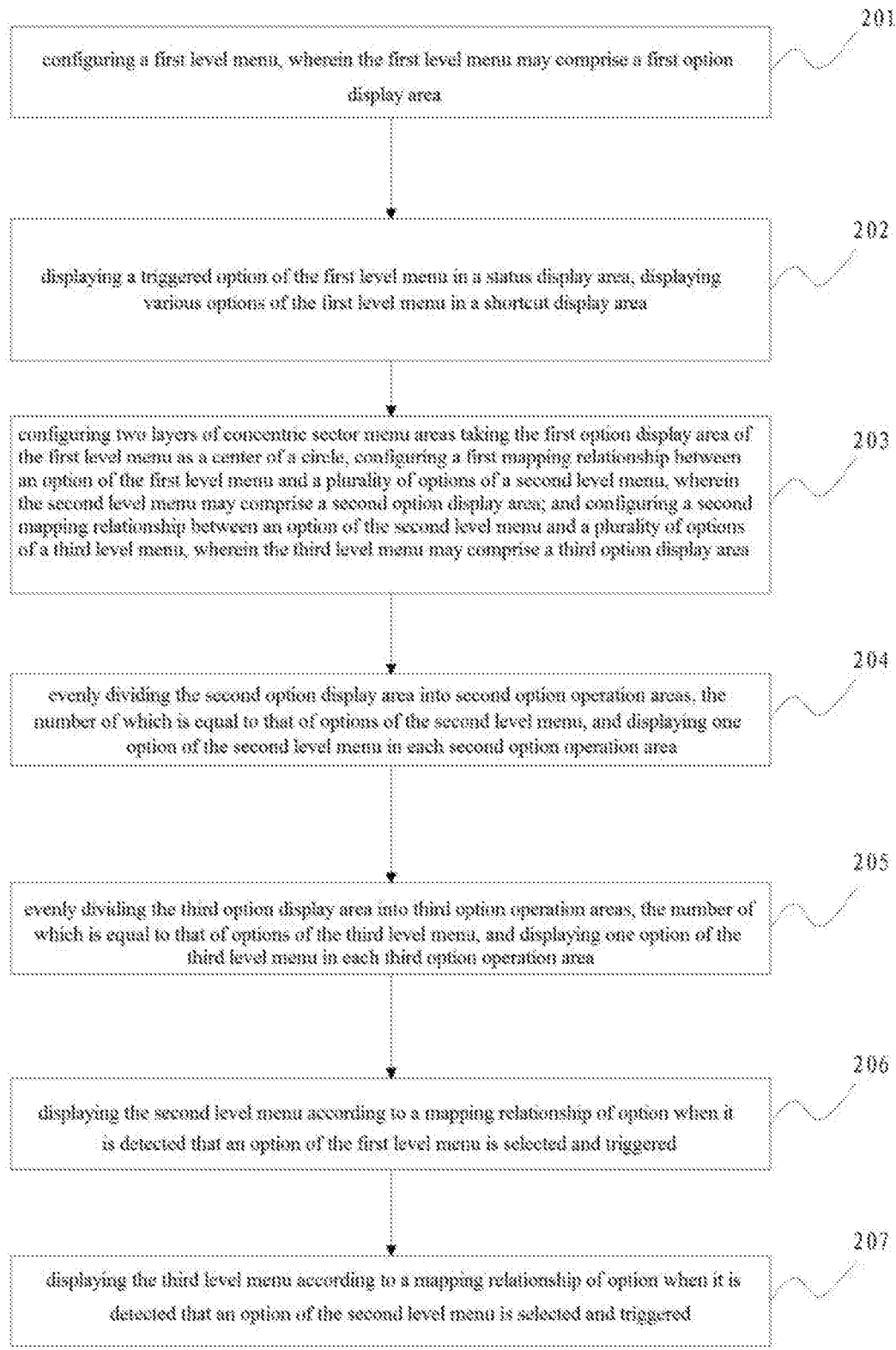
FIG. 2 is a flow chart of a method for processing an operation interface according to another embodiment of the present invention.

Referring to FIG. 2, the present disclosure may further provide another method for processing an operation interface. Specifically, the method includes the followings.

201, configuring a first level menu, and the first level menu may include a first option display area. This step is the same as step 101 in the previous embodiment, and details will be omitted herein.

202, displaying a triggered option of the first level menu in a status display area, and displaying various options of the first level menu in a first shortcut display area.

The first option display area may include a status display area for displaying a triggered option in the first level menu and a first shortcut display area in which various options corresponding to the first level menu are displayed. The status display area may be set as a circular region, and the first shortcut display area may be set in a sector region surrounding the circular region, with the circular region as the center of a circle. Further, various options of the first level menu may be arranged in a sequence of arcs within the sector region of the shortcut display area. The status display area may display a Chinese name, English name, or abbreviation in English or the like of the triggered option, without limitation, as long as a user may know the name of the trigged option of the first level menu through the status display area. Of course, the status display area may also display names of options of the next level menu, such that the user may know a triggered option in real time in the process of operating, facilitating the user to know operating status intuitively.

Optionally, the first option display area of the first level menu may further include a second shortcut display area. After a selected and triggered option of the first level menu is displayed in the status display area, the first shortcut display area may be hidden and the second shortcut display area may be displayed. At least one shortcut option associated with the selected and triggered option of the first level menu may be displayed in the second shortcut display area, such that the option of the first level menu that has been triggered may be no longer required to be displayed in the first shortcut display area and, thus, a more concise operation interface may be achieved.

Specifically, as explained above, the first option display area may include a status display area for displaying a triggered option in the first level menu and a first shortcut display area in which various options corresponding to the first level menu may be displayed. For example, the first shortcut display area may include option A and option B, when a user triggers option A in the first shortcut display area, the status display area displays option A, the first shortcut display area is hidden and option A and option B do not need to be displayed, while the second shortcut display area may display shortcut options associated with option A. For example option a1, option a2, then option a1 and option a2 will be displayed in the second shortcut display area. At least one shortcut option associated with the selected and triggered option of the first level menu is displayed in the second shortcut display area, and the first shortcut display area is bidden, such that the operation interfaces can be displayed more concisely and an aesthetic perception of the operation interfaces can be improved.

Optionally, the first option display area of the first level menu may further include a third shortcut display area. When it is detected that a scene mode option of the first level menu displayed in the first shortcut display area is selected and triggered, the third shortcut display area may be displayed, scene options of the first level menu may be displayed in the third shortcut display area. For example, the scene modes of the first shortcut display area may include a plurality of specific scenes, such as a night mode, a portrait mode or a macro mode or the like. Each specific scene may further include a specific parameter setting button. When a scene mode displayed in the first shortcut display area is triggered, the third shortcut display area may display a specific scene button. After the user chooses a specific desired scene button, the first shortcut display area and the third shortcut display area may each be hidden. Thus, space in an operation interface may be saved and more button settings may be accommodated in a display interface by the way of displaying by layers.

In some embodiments, optionally, a shortcut display area may be evenly divided into first option operation areas, the number of which is equal to that of total options of the first level menu, and one option of the first level menu is displayed in each first option operation area in a form of a button. "Evenly divided" mentioned herein may be understood that the shortcut display area may be evenly divided into a plurality of regions with the same shape, such that each of the plurality of regions for each option is distributed uniformly, and the display interface is neat, improving comfortableness of the user in the course of use.

203, using the first option display area of the first level menu as the center of a circle, configuring two layers of concentric sector menu areas, configuring a first mapping relationship between an option of the first level menu and a plurality of options of a second level menu, where the second level menu may include a second option display area; and configuring a second mapping relationship between an option of the second level menu and a plurality of options of a third level menu, where the third level menu may include a third option display area.

That is, two layers of concentric sector regions may be configured using the first option display area as the center of a circle, and an individual option in the first level menu may be in a first mapping relationship with a plurality of options in the second level menu, which means that, an option in the first level menu may include selectable functions of a plurality of options of the second level menu. An individual option of the second level menu may be in a second mapping relationship with a plurality of options in the third level menu. That is, an option in the second level menu may include selectable functions of a plurality of options of the third level menu, i.e. in a way of progressive layers, such that a user may accomplish a wanted operation at most in the third level menu. For example, option A of the first level menu may be in a first mapping relationship with option a1 and option a2 of the second level menu, and option at in the second level menu may be in a second mapping relationship with option a11 and option a12 of the third level menu. When a user wants to operate option a12, option a1 and option a2 of the second level menu may be displayed by triggering option A in the first level menu. Further, the user continues to trigger option a1 and, at this time, the option a11 and option a12 in the third level menu may be displayed, then the user may trigger option a12 to accomplish the desired operation. A user may look up a wanted operation option according to a guidance of different hierarchical menus in the course of operation by displaying operations in classification. Thus, it is easy to look up, and convenient to use by a user, and the operating course is simple and concise.

204, evenly dividing the second option display area into a plurality of second option operation areas, the total number of which is equal to that of options of the second level menu, and displaying one option of the second level menu in each second option operation area.

Accordingly, in some embodiments, the second option display area may be evenly divided into a plurality of second option operation areas, the total number of which is equal to that of options of the second level menu, such that various options of the second level menu may be displayed in each second option operation area in a form of option button. Since each option of the first level menu functions differently, the number of options of the second level menu corresponding to various options of the first level menu is different as well. The second option display area may be evenly dividedly flexibly according to the number of options of the second level menu, and one option of the second level menu may be set within each evenly divided second option operation area. For example, option A in the first level menu may be in a first mapping relationship with option a1 and option a2 in the second level menu, option B in the first level menu may be in a first mapping relationship with option b1, option b2 and option b3 in the second level menu. When option A is triggered, the second option display area may only need to display two options of option a1 and option a2 and, at this time, the second option display area is then evenly divided into two second option operation areas. When option B is triggered, the second option display area is evenly divided into three second option operation areas, to display the option b1, option b2 and option b3. Such design may achieve a wholly concise operation interface that is convenient for a user to operate.

205, evenly dividing the third option display area into a plurality of third option operation areas, the total number of which is equal to that of options of the third level menu, and displaying one option of the third level menu in each third option operation area.

Accordingly, in some embodiments, the third option display area may be evenly divided into the third option operation areas, the number of which is equal to that of options of the third level menu, various options of the third level menu may be displayed in each third option operation area in a form of option button. Since each option of the second level menu functions differently, the number of options of the third level menu corresponding to various options of the second level menu is different as well. The third option display area may be evenly divided flexibly according to the number of options of the third level menu, and one option of the third level menu may be set within each evenly divided third option operation area. The principle thereof is the same as that of step 204, examples of which are omitted herein. Similarly, such approach may achieve certain advantages, such as an integral and concise operation interface that is convenient for a user to operate.

206, when it is detected that an option of the first level menu is triggered, displaying the second level menu according to a mapping relationship of the option. This step may be the same as step 103 in the previous embodiment, details of which are omitted here.

207, when it is detected that an option of the second level menu is triggered, displaying the third level menu according to a mapping relationship of the option. This step may be the same as step 104 in the previous embodiment, details of which are omitted here.

Optionally, as options are displayed in the first level menu, the second level menu and the third level menu, approaches other than evenly dividing the sector menu area according to the number of options may also be used. For example, the sector menu area may be evenly divided into a fixed number of portions. For instance, the sector menu area is evenly divided into ten portions, thus the sector menu area may display ten options. Of course, the fixed number may be determined based on actual requirements. When various levels of menus are displayed using the fixed number, and when the number of options of a certain level menu exceeds the fixed number, all options of the certain level menu cannot be displayed directly in the sector menu area of the certain level menu, and the options that cannot be displayed may be set to be hidden. The options of the certain level menu may be scrollingly displayed through a way of sliding operation. Specifically, when it is detected that a view operation for the options of the second level menu is preformed, the second level menu may be displayed rotatably using the first option display area as the center of a circle. When it is detected a view operation for the options of the third level menu is performed, the third level menu may be displayed rotatably taking the first option display area as the center of a circle. Thus, the operation interface may be neat by setting a fixed number to evenly divide a sector menu area, such that the buttons of options may be more convenient for a user to select and operate.

A specific menu setting will be explained below when the above described method for processing an operation interface is applied to a scenario of controlling an image acquisition device, in particular a scene of a video camera of an unmanned aerial vehicle performing remote image acquisition.

Optionally, options of the first level menu may include at least one of a shutter priority mode, a program priority mode, a full manual mode and a scene mode.

The shutter priority mode, the program priority mode, the full manual mode, and the scene mode mentioned herein may be of the same operating principles as those of commonly used camera or video camera, etc. Of course, the options of the first level menu is not limited to the above described modes, and may also include an aperture priority mode. However, the video camera on an unmanned aerial vehicle may generally be a video camera with a fixed aperture, a function corresponding to an aperture priority mode may be relatively limited. But, when the unmanned aerial vehicle employs a video camera with adjustable aperture, the aperture priority mode may be applied normally.

Optionally, at least one shortcut setting option displayed in the second shortcut display area may include, but not be limited to, an ISO photosensitiveness option, a shutter option, and an Exposure Value (EV) option; and the shortcut functional setting option may include, but not be limited to, at least one of a portrait mode, a landscape mode, a night mode, a night and portrait mode, a dynamic mode, a macro mode, a backlighting mode, and a panorama mode, etc.

Optionally, options of the second level menu may include, but not be limited to, at least one of a shooting pattern setting, an image format setting, a photosensitiveness setting, an exposure compensation setting, a white balance setting, a digital filter setting, and an anti-scintillation setting, etc.

Of course, other function settings may be included in the second level menu, for example, a hue, a sharpness, a contrast ratio, a saturation and the like, may be added based on actual requirements.

Optionally, the options of the third level menu may include, but not be limited to, parameter setting options for selecting parameters for functions corresponding to the options of the second level menu.

A manner for setting parameters may be a choice of 'yes' or 'no', and may also be choices of different parameters, for example, whether to turn on noise reduction (yes or no), or photosensitiveness parameter to be selected from 100, 200, or 400, and the like. The manner may be specifically set according to different options and not limited herein.

Optionally, the trigger may include a single click, a double click, a sliding or a shortcut key.

The single click may mean that a user clicks the option once to trigger an option. The double click may mean that a user clicks the option twice continuously to trigger an option with the interval between the two clicks being less than a preset time threshold. The sliding may mean a user moves a segment of distance for the option on a display screen to trigger the option. The shortcut key may mean that a user selects and determines an option by pressing a virtual key or an actual key to trigger the option. The manner for the user to operate an option may not be limited thereto, as long as a function corresponding to an option is activated by the user operation.

Optionally, when a function corresponding to a third option operation area is not available, the third option operation area may become grey or hidden.

In some modes, when some functions and parameters may be logically exclusive, that is, a function option cannot include some settings for some parameters, it is required that setting options for the some parameters under the function option are hidden or become grey (i.e. unavailable), such that a user is not able to operate the options. For example, in a program priority mode, a shutter setting is not allowed. Thus, a corresponding option for the shutter setting in the program priority mode may be set as grey (i.e. unavailable) or hidden, such that a user cannot operate the option. Of course, this is just one of the cases, there are also many similar cases. For example, an exposure compensation setting, a detecting light mode setting, and an anti-scintillation setting cannot be performed in the full manual mode and, thus, options relating to these function may be set to be grey (i.e. unavailable) or hidden. Thus, as long as an option is set to be grey or hidden in the event that a function of the option is not allowed to be used, other manners may also be used, preventing a user's mis-operation to damage the camera.

Optionally, a message prompting area, a status display area, and a message display area may be configured in an operation interface. A selected and triggered option by a user may be displayed in the message prompting area in real time. The status display area may be configured for displaying a triggered option of the first level menu. An option currently operated by the user may be displayed in the message prompting area. The message display area may display a currently triggered option, which may be an option of the first level menu, an option of the second level menu, or an option of the third level menu. Such configuration may facilitate the user to know current operating status in real time, realizing a more human-friendly operation.

Accordingly, in some embodiments, a method for processing an operation interface is provided, different levels of menus may be displayed in hierarchies in a sector or sectors, a mapping relationship may be established between a previous level menu and a next level menu, such that a user may choose a corresponding option according to a desired operation in use, a layout way of sector diverging outwardly may cause a more concise picture, a larger range of parameters may be allowed to configure, more application scenarios may be satisfied, improving a user's experience.

Figure 3:
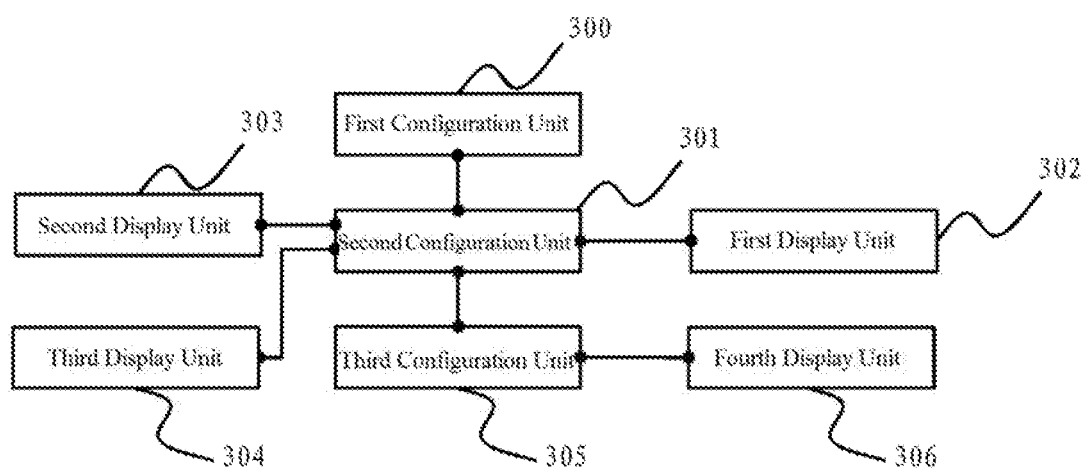
FIG. 3 is a structural diagram of a device for processing an operation interface according to an embodiment of the present invention.

According to the method for processing the operation interface described above, a device corresponding to the method for processing the operation interface can also be provided. Referring to FIGS. 3 and 4, the present disclosure provides a device for processing an operation interface.

In some embodiments, the device may comprise a first configuration unit 300, a second configuration unit 301, a first display unit 302, and a second display unit 303.

The first configuration unit 300 may be configured for configuring a first level menu and, in some embodiments, the first level menu may include a first option display area.

The second configured unit 301 may be configured for configuring at least two layers of concentric sector menu areas using the first option display area of the first level menu as the center of a circle. The at least two layers of concentric sector menu areas may include a second level menu mapped with various options of the first level menu and comprising a second option display area, and a third level menu mapped with various options of the second level menu and comprising a third option display area.

The first display unit 302 may be configured for, when it is detected that an option of the first level menu is selected and triggered, displaying the second level menu according to a mapping relationship of the option.

The second display unit 303 may be configured for, when it is detected that an option of the second level menu is selected and triggered, displaying the third level menu according to a mapping relationship of the option.

Optionally, the device may comprise a third display unit 304 configured for displaying a triggered option of the first level menu in a status display area and displaying various options of the first level menu in a shortcut display area.

Optionally, the third display unit 304 may be further configured for, after the selected and triggered option of the first level menu is displayed in the status display area, hiding a first shortcut display area and displaying a second shortcut display area, and displaying at least one shortcut option associated with the selected and triggered option of the first level menu in the second shortcut display area.

Optionally, the first option display area of the first level menu may further include a third shortcut display area. When it is detected that a scene mode option of the first level menu displayed in the first shortcut display area is selected and triggered, the third shortcut display area may be displayed, scene options of the first level menu may be displayed in the third shortcut display area. Further, the third shortcut display area may be displayed, and a shortcut function setting option associated with the selected shortcut option may be displayed in the third shortcut display area.

Optionally, the second configuration unit 301 may be further configured for configuring a first mapping relationship between an option of the first level menu and a plurality of options of a second level menu, where the second level menu may include a second option display area; and for configuring a second mapping relationship between an option of the second level menu and a plurality of options of a third level menu, where the third level menu may include a third option display area.

Optionally, the second configuration unit 301 may be further configured for evenly dividing a shortcut display area into a plurality of first option operation areas, the total number of which is equal to that of options of the first level menu; and displaying one option of the first level menu in each first option operation area.

Optionally, the second configuration unit 301 may be further configured for evenly dividing a second option display area into a plurality of second option operation areas, the total number of which is equal to that of options of the second level menu, and displaying one option of the second level menu in each second option operation area. The second configuration unit 301 may be further configured for evenly dividing a third option display area into a plurality of third option operation areas, the total number of which is equal to that of options of the third level menu; and displaying one option of the third level menu in each third option operation area.

The options of the first level menu may include at least one of a shutter priority mode, a program priority mode, a full manual mode, and a scene mode.

At least one shortcut setting option displayed in the second shortcut display area may include, but not be limited to, an ISO option, a shutter option and an exposure EV option. Further, the shortcut function setting option may include, but not be limited to, at least one of a portrait mode, a landscape mode, a night mode, a night and portrait mode, a dynamic mode, a macro mode, a backlighting mode, and a panorama mode, etc.

Optionally, the device may further comprise a third configuration unit 305 configured for configuring a message display area.

Optionally, the device may further comprise a fourth display unit 306 configured for displaying in real time an option selected and triggered by a user in a message prompting area.

Optionally, the second display unit 302 may be further configured for displaying rotatably the second level menu using the first option display area as the center of a circle when a view operation for the options of the second level menu is detected.

Optionally, the third display unit 303 may be further configured for displaying rotatably the third level menu using the first option display area as a center of a circle when a view operation for the options of the third level menu is detected.

The options of the second level menu may include at least one of a shooting mode setting, an image format setting, a photosensitiveness setting, an exposure compensation setting, a white balance setting, a digital filter setting, and an anti-scintillation setting, etc.

The options of the third level menu may include a parameter setting option for selecting a parameter for a function corresponding to an option of the second level menu.

Accordingly, the present disclosure provides a device for processing an operation interface. The device includes: a first configuration unit 300 configured for configuring a first level menu, where the first level menu may include a first option display area; a second configuration unit 301 configured for configuring at least two layers of concentric sector menu areas using the first option display area of the first level menu as the center of a circle, where the at least two layers of concentric sector menu areas may include a second level menu mapped with various options of the first level menu and comprising a second option display area, and a third level menu mapped with various options of the second level menu and comprising a third option display area; a first display unit 302 configured for, when it is detected that an option of the first level menu is triggered, displaying the second level menu according to a mapping relationship of the option; a second display unit 303 configured for, when it is detect that an option of the second level menu is triggered, displaying the third level menu according to a mapping relationship of option. The first display unit 302 and the second display unit 303 may display sector menus in hierarchies, where a mapping relationship may be established between a previous level menu and a next level menu, such that a user may select a corresponding option as desired operation in use. The second configuration unit 301 may be in a sector layout expanding outwardly, such that the display can be more concise, a larger range of parameters may be configured, and more application scenarios are satisfied, improving the user experience. Those skilled in the art can understand that, for concise and convenient description, specific operating processes of the above-described system, device and unit may refer to the corresponding processes in the previous method embodiments.

Figure 5:
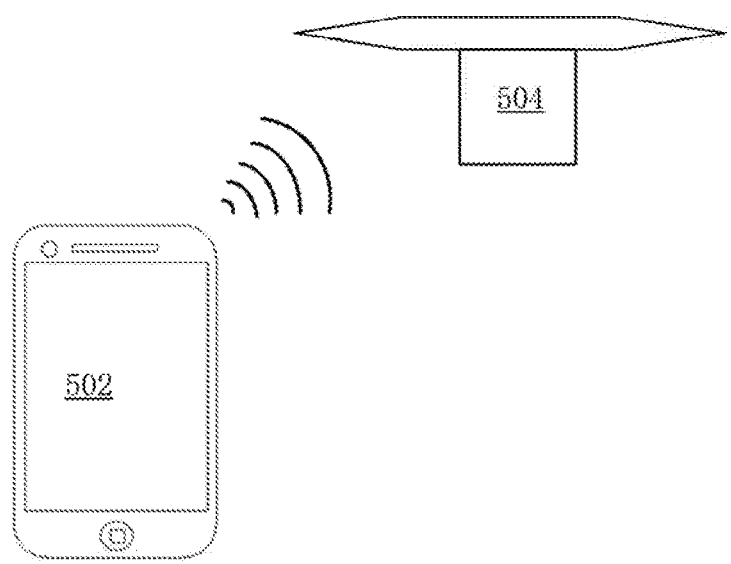
FIG. 5 is a device for processing an operation interface according to an embodiment of the present invention.

FIG. 5 illustrates an exemplary device. Referring to FIG. 5, a mobile device 502 may be provided to provide operation interface to configure and control an external device 504 through a wireless network interface (not labelled). The mobile device 502 may include any appropriate type of electronic device with computing capabilities, such as a mobile phone, a smartphone, a tablet, a personal computer (PC), a smart watch, a laptop computer, and a digital personal assistant (PDA), etc.

The external device 504 may include any appropriate type of device that is capable of communicating with the mobile device 502, and/or capable of being remotely controlled and/or monitored by the mobile device 502. For example, the external device 504 may be an unmanned aerial vehicle (UAV). The UAV may also have certain operating devices, such as camera, sensors, and other type of electronic devices.

Figure 6:
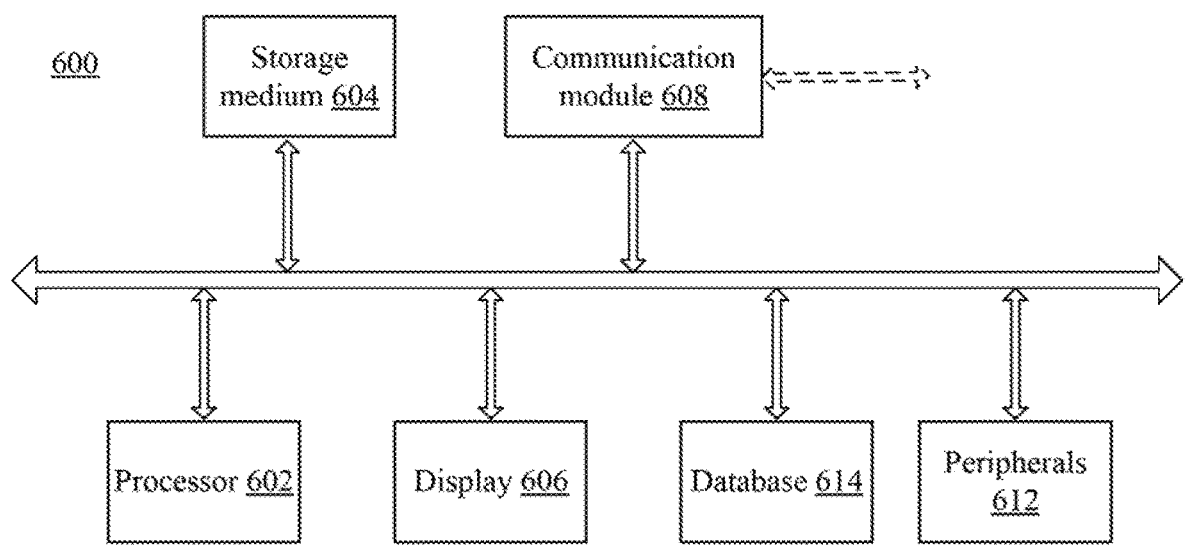
FIG. 6 is a schematic diagram of a device according to an embodiment of the present invention.

FIG. 6 shows a block diagram of an exemplary computing system capable of implementing the mobile device 502. Referring to FIG. 6, a computing system 600 may include a processor 602, a storage medium 604, a display 606, a communication module 608, a database 614, and peripherals 612. Certain components may be omitted and other components may be included.

The processor 602 may include any appropriate processor or processors. Further, the processor 602 can include multiple cores for multi-thread or parallel processing. The storage medium 604 may include memory modules, such as ROM, RAM, flash memory modules, and mass storages, such as CD-ROM and hard disk, etc. The storage medium 604 may store computer programs for implementing various processes, when the computer programs are executed by the processor 602.

Further, the peripherals 612 may include various sensors and other I/O devices, such as keyboard and mouse, and the communication module 608 may include certain network interface devices for establishing connections through wireless or other type of communication networks. The database 614 may include one or more databases for storing certain data and for performing certain operations on the stored data, such as database searching.

It should be understood that, in the embodiments provided by the present application, the disclosed system, device and method may be implemented by other ways. For example, the above described device embodiments are merely schematic; the division of the units is merely a logic function division and other division manners may be employed when it is actually practiced; and/or more units or components may be combined or may be integrated into another system. Alternatively, some features may be omitted or not be performed. Additionally, couplings or direct couplings or communication connections between one and another as displayed or discussed may be indirect couplings or communication connections via some interfaces, devices or units, or may be in electric, mechanical or other forms.

Units described as separate parts may or may not be physically separated. Components displayed as units may be or may not be physical units, i.e., may be located in one place, or may be distributed onto a plurality of network units. Some or all of the units may be selected in order to achieve the objects of the solutions of the embodiments according to the actual requirements.

Additionally, various functional units in various embodiments according to the present disclosure may be integrated into one processing unit, or may be physically separated. Two or more of various function units may be integrated into one unit. The above integrated unit may be implemented in a form of hardware or in a form of functional units of software.

It should be understood by those skilled in the art that all or some steps in various methods of the above described embodiments may be accomplished by programs instructing related hardware, the programs may be stored in a computer-readable storage medium, and the storage medium may include: a Read-Only Memory (ROM), a random access memory (RAM), a diskette or an optical disc or the like.

The above description is merely illustrative about a method and device for processing an operation interface provided by the present disclosure. For those skilled in the art, changes can be made to specific embodiments and application scopes in accordance with concepts of the disclosed embodiments of the present invention. Thus, the content of the present specification should not be construed to limit the present invention.

What is claimed is:

1. A method for processing an operation interface for remotely controlling a camera configured on an unmanned aerial vehicle (UVA), comprising:
   configuring a first level menu having a first plurality of options, the first plurality of options of the first level menu including a shutter priority mode, a program priority mode, a full manual mode and a scene mode;
   configuring a first option display area corresponding to the first level menu, the first option display area including a status display area, a first shortcut display area, a second shortcut display area, and a third shortcut display area;
   displaying the first plurality of options of the first level menu in the first shortcut display area;
   configuring a second level menu having a second plurality of options mapped to the first plurality of options of the first level menu, the second plurality of options including one or more of an image format setting, an exposure compensation setting, a white balance setting, a digital filter setting, and an anti-scintillation setting;
   configuring a third level menu having a third plurality of options mapped to the second plurality of options of the second level menu, the third plurality of options including parameter setting options for functions corresponding to the second plurality of options of the second level menu;
   using the first option display area of the first level menu as a center of a circle, configuring two additional layers of concentric display areas to form a whole sector having three levels of menu areas, the two additional layers of concentric display areas including a second option display area and a third option display area;
   displaying one or more of the second plurality of options of the second level menu in the second option display area;
   displaying one or more of the third plurality of options of the third level menu in the third option display area;
   in response to detecting that one of the first plurality options other than the scene mode option of the first level menu is selected and triggered, hiding the first shortcut display area, displaying the selected and triggered option of the first level menu in the status display area, and displaying, in the second shortcut display area, a fourth plurality of options corresponding to the selected and triggered option of the first level menu, the fourth plurality of options including one or more of an ISO option, a shutter option, and an Exposure Value (EV) option; and
   in response to detecting that the scene mode option of the first level menu is selected and triggered, displaying the scene mode option in the status display area, and displaying, in the third shortcut display area, a fifth plurality of options corresponding to the selected scene mode option, the fifth plurality of options including one or more of a portrait mode, a landscape mode, a night mode, a night and portrait mode, a dynamic mode, a macro mode, a backlighting mode, and a panorama mode.

2. The method for processing an operation interface of claim 1, wherein:
   configuring the second level menu includes configuring a first mapping relationship between an option of the first level menu and the second plurality of options of the second level menu; and
   configuring the third level menu includes configuring a second mapping relationship between an option of the second level menu and the third plurality of options of the third level menu.

3. The method for processing an operation interface of claim 1, wherein displaying the first plurality of options of the first level menu in the first shortcut display area comprises:

evenly dividing the shortcut display area into a plurality of first option operation areas, a total number of which is equal to that of the first plurality of options of the first level menu; and displaying one option of the first level menu in each first option operation area.

4. The method for processing an operation interface of claim 1, wherein displaying the second level menu comprises:

evenly dividing the second option display area into a plurality of second option operation areas, a total number of which is equal to that of the second plurality of options of the second level menu; and displaying one option of the second level menu in each second option operation area.

5. The method for processing an operation interface of claim 1, wherein displaying the third level menu comprises:

evenly dividing the third option display area into a plurality of third option operation areas, a total number of which is equal to that of the third plurality of options of the third level menu; and displaying one option of the third level menu in each third option operation area.

6. The method for processing an operation interface of claim 5, wherein, when a function corresponding to a third option operation area is unavailable, the third option operation area becomes grey or hidden.

7. The method for processing an operation interface of claim 1, further comprising:

when a view operation for an option of the second level menu is detected, displaying rotatably the second level menu using the first option display area as the center of the circle; and when a view operation for an option of the third level menu is detected, displaying rotatably the third level menu taking the first option display area as the center of the circle.

8. The method for processing an operation interface of claim 1, further comprising:

configuring a message prompting area; and displaying in real time an option selected and triggered by a user in the message prompting area.

9. A device for processing an operation interface for remotely controlling a camera configured on an unmanned aerial vehicle (UVA), comprising a processor and a memory, wherein the processor is configured to:

configure a first level menu having a first plurality of options, the first plurality of options of the first level menu including a shutter priority mode, a program priority mode, a full manual mode and a scene mode;

configure a first option display area corresponding to the first level menu, the first option display area including a status display area, a first shortcut display area, a second shortcut display area, and a third shortcut display area;

display the first plurality of options of the first level menu in the shortcut display area;

configure a second level menu having a second plurality of options mapped with to the first plurality of options of the first level menu, the second plurality of options including one or more of an image format setting, an exposure compensation setting, a white balance setting, a digital filter setting, and an anti-scintillation setting;

configure a third level menu having a third plurality of options mapped with to the second plurality of options of the second level menu, the third plurality of options including parameter setting options for functions corresponding to the second plurality of options of the second level menu;

configure two additional layers of concentric display areas using the first option display area as a center of a circle to form a whole sector having three levels of menu areas, the two additional layers of concentric display areas including a second option display and a third option display area;

display one or more of the second plurality of options of the second level menu in the second option display area;

display one or more of the third plurality of options of the third level menu in the third option display area;

in response to detecting that one of the first plurality options other than the scene mode option of the first level menu is selected and triggered, hide the first shortcut display area, display the selected and triggered option of the first level menu in the status display area, and display, in the second shortcut display area, a fourth plurality of options corresponding to the selected and triggered option of the first level menu, the fourth plurality of options including one or more of an ISO option, a shutter option, and an Exposure Value (EV) option; and in response to detecting that the scene mode option of the first level menu is selected and triggered, displaying the scene mode option in the status display area, and display, in the third shortcut display area, a fifth plurality of options corresponding to the selected scene mode option, the fifth plurality of options including one or more of a portrait mode, a landscape mode, a night mode, a night and portrait mode, a dynamic mode, a macro mode, a backlighting mode, and a panorama mode.

10. The device for processing an operation interface of claim 9, wherein the processor is further configured to:

configure a first mapping relationship between an option of the first level menu and the second plurality of options of the second level menu; and configure a second mapping relationship between an option of the second level menu and the third plurality of options of the third level menu.

11. The device for processing an operation interface of claim 10, wherein the processor is further configured to: evenly divide the first shortcut display area into a plurality of first option operation areas, a total number of which is equal to that of the first plurality of options of the first level menu, and display one option of the first level menu in each first option operation area.

12. The device for processing an operation interface of claim 11, wherein processor is further configured to: evenly divide the second option display area into a plurality of second option operation areas, a total number of which is equal to that of the second plurality of options of the second level menu, and display one option of the second level menu in each second option operation area.

13. The device for processing an operation interface of claim 11, wherein processor is further configured to: evenly divide the third option display area into a plurality of third option operation areas, a total number of which is equal to that of the third plurality of options of the third level menu, and display one option of the third level menu in each third option operation area.

14. The device for processing an operation interface of claim 13, wherein:
  the processor is further configured to:
    when a view operation for an option of the second level menu is detected, display rotatably the second level menu taking the first option display area as the center of the circle; and
    when a view operation for an option of the third level menu is detected, display rotatably the third level menu taking the first option display area as the center of the circle.

15. The device for processing an operation interface of claim 9, wherein the processor is further configured to:
  configure a message display area; and
  display in real time an option selected and triggered by a user in a message prompting area.

* * * * *